E. A. SLYE.
TACHOMETER.
APPLICATION FILED OCT. 2, 1917.

1,265,128.

Patented May 7, 1918.
2 SHEETS—SHEET 1.

INVENTOR
Edward A. Slye
BY
Redding, Greeley & Goodlett
ATTORNEYS.

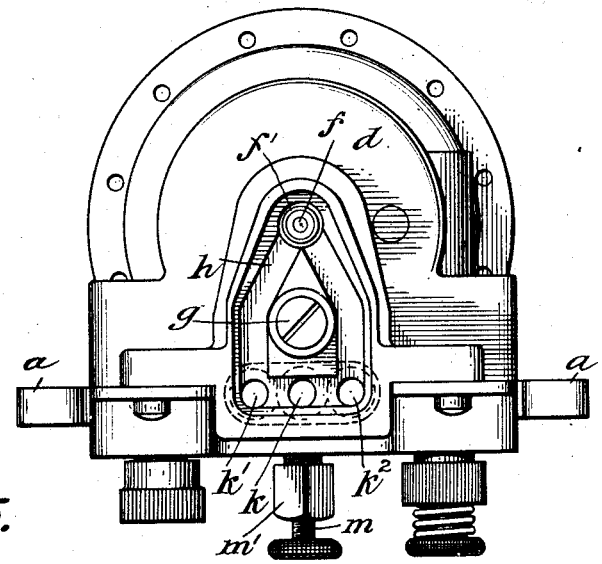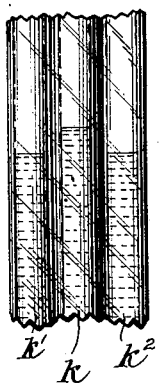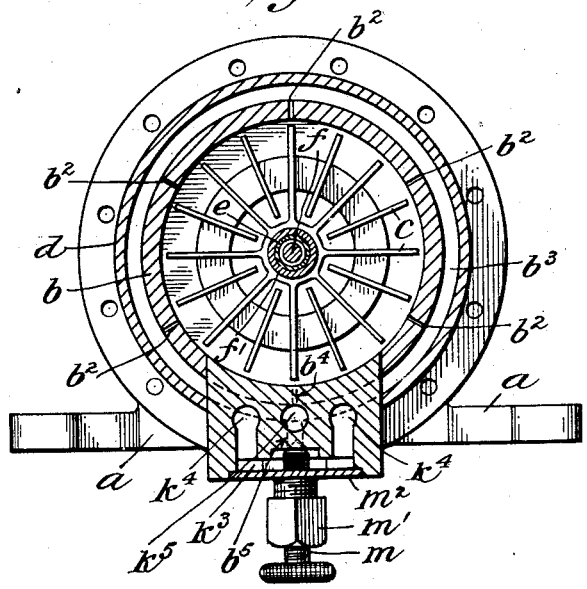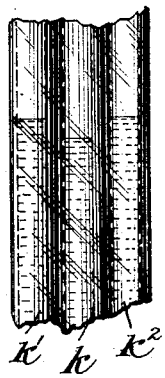

UNITED STATES PATENT OFFICE.

EDWARD A. SLYE, OF HARTFORD, CONNECTICUT, ASSIGNOR TO THE VEEDER MANUFACTURING COMPANY, OF HARTFORD, CONNECTICUT, A CORPORATION OF CONNECTICUT.

TACHOMETER.

1,265,128.   Specification of Letters Patent.   Patented May 7, 1918.

Application filed October 2, 1917.   Serial No. 194,316.

*To all whom it may concern:*

Be it known that I, EDWARD A. SLYE, a citizen of the United States, and residing in the city of Hartford, in the State of Connecticut, have invented certain new and useful Improvements in Tachometers, of which the following is a specification, reference being had to the accompanying drawings, forming a part hereof.

This invention relates to instruments or devices for indicating and measuring the speed of rotation of shafts and other rotating bodies in which the speed of rotation is indicated by the height of a column of liquid acted upon by an impeller which is driven from or with the shaft or other rotating body. Instruments of this general character are shown and described in Letters Patent of the United States Nos. 732,975 and 733,358, both dated July 7, 1903, a later form of such instruments, generally similar to that illustrated herein as an embodiment of the present invention, being shown and described in Letters Patent of the United States No. 1,016,906, dated February 6, 1912.

The instrument which has been chosen for illustration of an embodiment of the present invention has been designed especially for use in connection with aeroplane motors, and one object of the invention is to enable the pilot of an aeroplane to determine at a glance whether the speed of the motor is increasing or diminishing, and a further object is to indicate not only the speed of the motor subject to temporary fluctuations, but to indicate at the same time the general speed of the motor not affected by temporary fluctuations. To accomplish these purposes there are connected with the chamber of the impeller two indicator tubes, one of which is connected therewith through a free or unrestricted opening so that the liquid therein rises and falls quickly with variations in the speed of the impeller, while the other is connected therewith through a restricted opening so that the liquid in the tube rises and falls somewhat slowly, its height not being visibly affected by temporary fluctuations in the speed of the impeller. A glance at the two tubes which stand side by side shows whether the speed of the motor is increasing or decreasing, for if it is increasing the liquid in the tube connected through an unrestricted opening will stand at a higher level than the liquid in the other tube while if the speed is decreasing the liquid in the tube connected through an unrestricted opening will stand at a lower level than that in the other tube. The invention will be more fully explained hereinafter with reference to the accompanying drawings in which it is illustrated and in which—

Fig. 3 is a top view of the tachometer, on a larger scale than that of Figs. 1 and 2, with the top or cover removed.

Fig. 4 is a view in section on the plane indicated by the broken line 4—4 of Fig. 1, looking in the direction of the arrows, the scale of this figure being the same as that of Fig. 3.

Figs. 5 and 6 are detail views illustrating respectively the relative heights of the columns of liquid in the indicator tubes when the speed of the motor is increasing and when it is decreasing.

Figure 1:
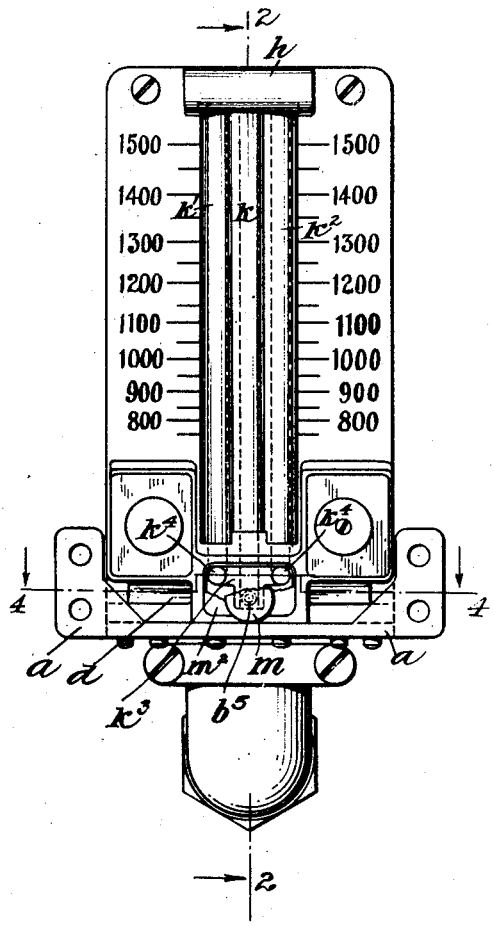
Figure 1 is a view in front elevation of a tachometer which embodies the invention, a portion of the lower plate being broken away.
Figure 2:
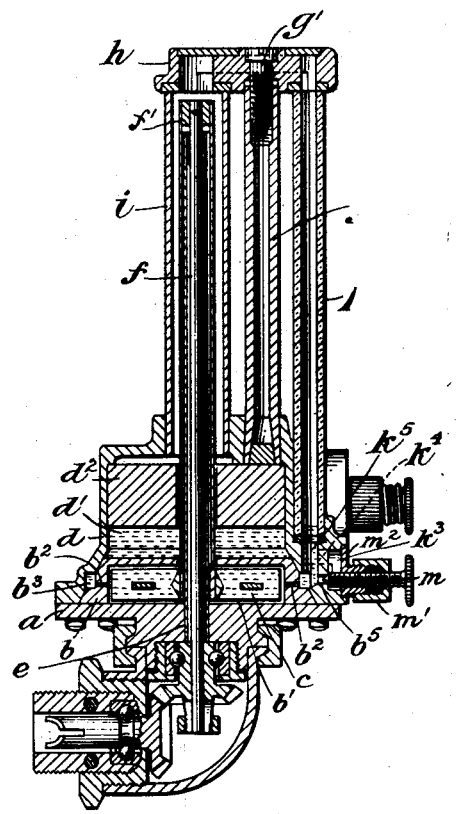
Fig. 2 is a view in section on the plane indicated by the broken line 2—2 of Fig. 1, looking in the direction of the arrows.

Except as to the connection to the impeller chamber of different tubes the tachometer may be constructed in general as shown and described in said Letters Patent No. 1,016,906. The base $a$ supports a block or casing $b$ which forms the chamber $b'$ for the impeller $c$. The base $a$ also supports concentrically with the block or casing $b$, a casing $d$ which forms a chamber or reservoir $d'$ for the liquid and receives a movable plunger $d^2$ by which the normal height of the liquid in the indicator tubes can be regulated. In order that the impeller may be driven from below a tube $e$ is secured at its lower end in the base $a$ and rises nearly to the top of the instrument. Within the tube $e$ is a shaft $f$ which may be driven from or with a rotating part the speed of which is to be indicated, and to the upper end of the shaft, above the upper end of the tube $e$, is secured a sleeve $f'$ which carries at its lower end the impeller $c$. The impeller chamber $b'$ is connected through a series of radial openings $b^2$ with an annular chamber $b^3$ which may be formed partly in the block or casing $b$ and partly in the lower portion of the casing $d$.

By means of a standard $g$, secured at its lower end in the casing $d$, and a screw $g'$, there is secured in proper relative position with respect to the base $a$ and casing $d$, a channeled header $h$. A tube $i$, surrounding the sleeve $f'$, is held in place between the casing $d$ and the header $h$, and also held in place between the casing $d$ and the header $h$ are three indicator tubes $k$, $k'$ and $k^2$. Through the channeled header $h$ and the sleeve $f$ all of these three tubes preferably are placed in free communication with the chamber or reservoir $d'$ for the free return thereto of whatever liquid may be raised above the indicator tubes and for the equalization of pressure. The two outer tubes $k'$, $k^2$ communicate freely with each other, through a common passage $k^3$ and channels $k^4$, and with the annular chamber $b^3$ through a channel $b^5$ which can be restricted by a needle-valve $m$ threaded through a suitable stuffing-box $m'$ in the plate $m^2$ which forms the front wall of the chamber $k^3$. The middle tube $k$ communicates freely with the annular chamber $b^3$ through a channel $k^5$.

In the operation of the improved tachometer the height of the liquid in the central tube responds immediately, by reason of the comparatively unrestricted communication with the impeller chamber, to temporary variations in the speed of the impeller and the height of the liquid in this tube therefore fluctuates. On the other hand the level of the liquid in the side tubes $k'$, $k^2$ which are connected with the impeller chamber only through a comparatively restricted passage, varies slowly and therefore does not respond visibly to mere temporary variations in the speed of the impeller but indicates a general average of the speed of the impeller during a short period of time. The pilot of the aeroplane or the operator of any other machine to which the tachometer may be applied may therefore observe the general speed of the motor or other rotating part and at the same time may observe the temporary fluctuations in speed. Furthermore, if the level of the liquid in the center tube is higher than the level of the liquid in the side tubes $k'$, $k^2$, as shown in Fig. 5, the observer may know that the speed of the motor or other rotating part is increasing, while if it is lower, as indicated in Fig. 6, he may know that the speed of the motor is decreasing. Two tubes $k'$, $k^2$ are preferably provided because the eye of the observer will then inform him instantly, without conscious thought, whether the speed is increasing or decreasing, whereas if only one freely communicating tube and one restricted tube were provided the observer might for the moment be confused in thought as to which tube indicates the average speed and which the fluctuating speed.

For convenience the invention has been illustrated herein as employed in connection with a tachometer of a particular form, but it will be understood that it might be employed in connection with similar instruments of other forms, such as that shown, for example, in the earlier patents above mentioned.

I claim as my invention:

1. In an instrument of the character described, the combination of an impeller chamber, an impeller therein, and a plurality of indicating tubes connected with the impeller chamber, one of said tubes being connected with the impeller chamber through a relatively restricted passage and another of said tubes being connected with the impeller chamber through a relatively free passage.

2. In an instrument of the character described, the combination of an impeller chamber, an impeller therein, an annular chamber connected with the impeller chamber through a series of radial passages, and a plurality of indicating tubes, one of said tubes being connected with the annular chamber through a relatively free passage, and another of said tubes being connected with the annular chamber through a relatively restricted passage.

3. In an instrument of the character described, the combination of an impeller chamber, an impeller therein, a plurality of indicating tubes, one of said tubes being connected with the discharge of the impeller chamber through a relatively restricted passage and another of said tubes being connected with the discharge of the impeller chamber through a relatively free passage, and means to vary the degree of restriction of the connection between the first named tube and the discharge of the impeller chamber.

This specification signed this 20 day of September A. D. 1917.

EDWARD A. SLYE.